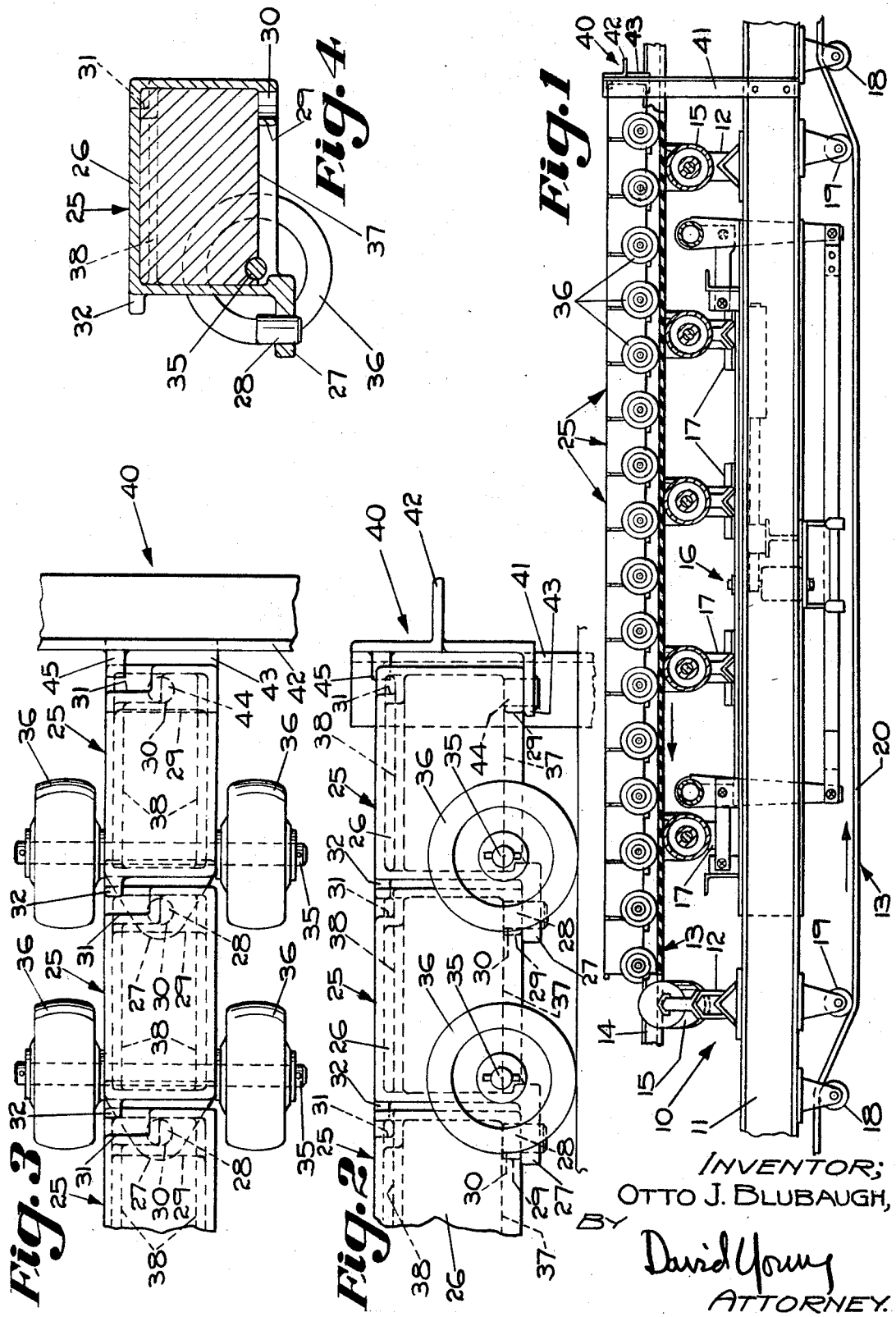

United States Patent Office 3,396,573
Patented Aug. 13, 1968

3,396,573
CALIBRATION OF BELT CONVEYOR SCALES
Otto J. Blubaugh, Columbus, Ohio, assignor to Jeffrey Galion Manufacturing Company, a corporation of Ohio
Filed Sept. 22, 1965, Ser. No. 489,270
6 Claims. (Cl. 73—1)

ABSTRACT OF THE DISCLOSURE

Calibration of a belt conveyor scale, for the weight of material on the conveyor belt, with a plurality of calibration trucks which are arranged in succession along the conveyor belt and over the scale. Each truck has a given weight to impose a uniform loading on the conveyor belt and on the scale.

---

The instant invention relates to the calibration of belt conveyor scales, and more particularly to improved means and method for such calibration.

A belt conveyor scale is customarily installed in the conveyor framework. The scale may include a plurality of belt supporting idlers. As the belt with its load of material travels over the idlers of the scale, the force of the load is transmitted to the idlers and to the scale, which is responsive to such force and thereby provides an indication of the weight of the load of material carried by the belt. In setting up the scale in the belt conveyor it is necessary to calibrate the scale for the loading on the conveyor belt in order to provide an accurate reading of the weight of material carried by the belt. Such calibration requires that a known loading be applied to the conveyor belt, and uniformly distributed on the conveyor belt so that the calibration may be effectively accomplished.

It is accordingly an object of this invention to provide improved means and method to facilitate the calibration of a scale in a belt conveyor.

It is another object of the instant invention to provide improved means and method for calibrating a belt conveyor scale, in which a calibrating load is applied to the conveyor belt and is uniformly distributed on the conveyor belt.

It is a further object of the instant invention to provide improved means and method for calibrating a belt conveyor scale, in which individual weighted trucks are attached to each other in succession to provide a calibrating load on the conveyor belt.

It is another object of the instant invention to provide improved calibrating means in a belt conveyor, in which such calibrating means is held in fixed position and the conveyor belt is permitted to move relatively to the calibrating means while being loaded by the calibrating means.

Other objects of the invention will appear hereinafter, the novel features and combinations being set forth in the appended claims.

In the drawings:
FIG. 1 is a side elevational view, partially in section, of a belt conveyor with a scale and the calibrating means of this invention;
FIG. 2 is a side elevational view of the calibrating trucks;
FIG. 3 is a top plan view of the calibrating trucks; and
FIG. 4 is a side elevational view, in section, of a calibrating truck.

Referring to the drawings, there is illustrated therein a belt conveyor 10 having a longitudinally extending frame 11. A plurality of troughing idlers 12 are secured to the conveyor frame 11 at spaced positions along the length of the frame, for supporting the conveyor belt 13 in its conveying run 14. Each troughing idler 12 has a plurality of rotatably supported rolls 15 arranged in troughed disposition to support the conveying run 14 in a troughed configuration and to permit the conveyor belt 13 to travel over the troughing idlers 12.

A belt conveyor scale 16 is mounted on the conveyor frame 11 and secured thereto in fixed position to weigh the material that is carried by the conveying run 14. The belt conveyor scale 16 may be constructed in accordance with the invention described in my patent application, Ser. No. 447,037, filed Apr. 9, 1965, for Belt Conveyor Weighing Apparatus, now Patent No. 3,331,457, issued July 18, 1967. The belt conveyor scale 16 has a plurality of troughing idlers 17, which are disposed at spaced positions along the conveyor scale 16 to support the conveying run 14 of the conveyor belt 13. Each troughing idler 17 is constructed similarly to the troughing idlers 12, and is aligned with the latter so that there is no interruption of the idler support for the conveying run 14.

A plurality of return idlers 18, 19 are secured to the underside of the conveyor frame 11 to support the return run 20 of the conveyor belt 13. The return run 20 is directed under the return idlers 19, 19, in order to pass below the belt conveyor scale 16 and to clear the latter.

In order to accurately calibrate the belt conveyor scale 16, for the weight of material on the conveyor belt, it is necessary to load the belt conveying run 14 in a uniform manner along a substantial length thereof, extending over the conveyor scale 16. For this purpose, there is provided a plurality of calibrating trucks 25, which are connected to each other in succession in a longitudinal line. The calibrating trucks 25 are uniformly weighted, and are placed on the conveying run 14 over the conveyor scale 16 to provide the desired loading for calibration.

Each truck 25 has a rectangular body 26 formed with upright side walls, and a top wall, and a large opening in the bottom of the body 26. At one end of the rectangular body, there is a supporting sill 27 which extends forwardly from the body 26. An upright pivot pin 28 is secured to the supporting sill 27. A foot 29 is disposed at the rear of the rectangular body 26. An aperture 30 is formed in the foot 29 in position to receive the upright pivot pin of an adjacent truck 25. With a pivot pin 28 received in an aperture 30, the foot 29 is on the supporting sill 27, whereby the rear end of one truck 25 is supported on the forwardly extending sill 27 of the adjacent truck 25. The pivot pin 28 has a loose fit in the aperture 30, and the adjacent trucks 25 are spaced from each other, which permits movement of one truck 25 relatively to another truck 25 in the lateral direction with respect to the conveyor belt 13.

At the rear end, and at the top of each calibrating truck 25, there is a notch 31 which opens to the rear and to the side of the truck 25. An ear 32 is formed on the front end of each truck 25 and extends forwardly into the notch 31. When the upright pivot pin 28 of one truck 25 is engaged in the aperture 30 of an adjacent truck 25, the ear 32 is disposed in the notch 31 and thereby prevents disengagement of the pivot pin 28 from the aperture 30. The ear 32 is loosely received in the notch 31 to permit a freedom of movement of one truck 25 relatively to an adjacent truck 25 in the upright direction relatively to the conveyor belt 13. The ear 32 is disengaged from the notch 31 by swinging one truck 25 relative to the adjacent truck 25 about the axis of the pivot pin 28. Then, the pivot pin 28 may be disengaged from the aperture 30. The reverse procedure is followed in engaging one truck 25 with another truck 25.

A transverse axle 35 is secured to the front end of each truck 25 and extends through to opposite sides of the truck 25. Wheels 36, 36 are rotatably mounted on the ends of each axle 35. The wheels 36 support the calibrating trucks 25 on the belt conveying run 14. In the calibrating operation, the conveyor belt 13 travels under the calibrating truck 25. The wheels 36 are moved by the conveying run 14, being rotated by the latter, and the wheels 36 move relatively to the trucks 25 about the axes of the axles 35.

Each calibrating truck 25 is weighted with a mass of dense material 37 that substantially fills the body 26. One material that may be used to weight a truck 25 is lead, which is easily melted and then poured into the hollow body 26, wherein it solidifies and effectively becomes a part of the truck 25. The truck body 26 includes interior ribs 38 on the side walls, which anchor the material 37 within the body 26. It will be understood that in the course of weighting the trucks 25, each truck 25 is weighted to add just sufficient material 37 to the truck 25 to bring its weight to a given magnitude. In a set of calibrating trucks 25, each truck 25 is of the same weight.

A hitch 40 is provided for securing the line of calibrating trucks 25 in fixed position in the longitudinal direction of the conveyor belt 13. At each side of the conveyor frame 11 there is an upright post 41. A transverse beam 42 is secured to the upright posts 41 and extends transversely between the posts 41. A supporting sill 43 is secured to the transverse beam 42 at a centered position. An upright pivot pin 44 is secured to the supporting sill 43. An ear 45 is secured to the transverse beam 42 and projects from the latter. The size and disposition of the supporting sill 43, the upright pivot pin 44 and the ear 45 on the transverse beam 42 corresponds to the size and disposition of the supporting sill 27, the upright pivot pin 28 and the ear 32 on a calibrating truck 25. Thus, the first calibrating truck 25 may be connected to the hitch 40 by engagement with the upright pivot pin 44 and the ear 45. Then, each successive truck 25 is connected to the preceding truck 25, as has been described.

In the method of calibrating the conveyor belt scale 16 by the calibrating trucks 25, the weighted trucks 25 are connected one to another in succession, with the first truck being connected to the hitch 40 to fix the position of the line of trucks in the longitudinal direction. The calibrating trucks 25 extend over the belt conveyor scale 16 and beyond the ends of the belt conveyor scale 16 in opposite directions, in order to assure a uniform loading through the several troughing idlers 17. The individual trucks 25 have a freedom of movement relatively to each other by reason of the loose connections thereof, so that there is a uniform loading on the belt conveying run 14 as the latter moves under the calibrating trucks 25 and relatively thereto.

Each calibrating truck 25 in a set is of the same weight. However, it will be understood that the calibrating trucks 25 may be constructed with different weights for different calibrations, the particular weight of a truck 25 being determined by the basic weight thereof plus the weight of material that is added. In the calibrating means and method of this invention, the weight that is handled in the course of the calibration is not more than the weight of one truck 25, although the total calibrating weight consists of the plurality of individual trucks 25 which are connected to each other in line. This greatly facilitates the method of calibration of the conveyor belt scale.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. Means for calibrating a scale in a belt conveyor in which said scale is placed under the conveyor belt such that the conveyor belt with the material carried thereby is adapted to bear on the scale, comprising a plurality of calibrating trucks arranged in succession along said conveyor belt and over said scale, each said truck including a given weight, means to connect said trucks one to another in succession, and movable supporting means for each said truck on said conveyor belt that is movable by the conveyor belt about an axis and relatively to the truck.

2. Means for calibrating a scale in a belt conveyor as recited in claim 1 in which each said calibrating truck is formed with a hollow body that is filled with a given amount of dense material to weight the truck.

3. Means for calibrating a scale in a belt conveyor as recited in claim 1 in which said connecting means for said trucks comprises elements of said trucks that are interengaged with each other, and said interengaging elements having a loose fit with each other in an upright direction with respect to said conveyor belt and in a transverse direction with respect to said conveyor belt to provide a freedom of movement of said trucks one with respect to another in said upright direction and in said transverse direction.

4. Means for calibrating a scale in a belt conveyor as recited in claim 1 in which said connecting means for adjacent ones of said trucks comprises an upright pivot on one truck, an aperture on another adjacent truck adapted to engage with said upright pivot and having a loose fit for freedom of movement in a transverse direction with respect to said conveyor belt, a longitudinally projecting ear on one truck, a notch on another adjacent truck to receive said ear and having a loose fit for freedom of movement in an upright direction with respect to said conveyor belt, and said notch having a side opening for engagement and disengagement of said ear and said notch by swinging one truck relatively to another truck in said transverse direction for engagement and disengagement of said upright pivot and said aperture.

5. Means for calibrating a scale in a belt conveyor as recited in claim 1 in which said movable supporting means for each said truck comprises a transverse axle, at least one wheel rotatably mounted on said axle and bearing on said conveyor belt for rotation of said wheel by longitudinal movement of said conveyor belt and relatively to said truck.

6. Means for calibrating a scale in a belt conveyor in which said scale is placed under the conveyor belt such that the conveyor belt with the material carried thereby is adapted to bear on the scale, comprising a plurality of calibrating trucks arranged in succession along said conveyor belt and over said scale, each said truck including a given weight, means to connect adjacent ones of said trucks to each other including a supporting sill on one truck projecting longitudinally therefrom, an upright pivot on said sill, another adjacent truck including a foot to bear on said supporting sill, an aperture in said foot to engage said pivot for transverse swinging movement of said adjacent trucks relatively to each other, an ear on one truck projecting longitudinally from the one truck at one side thereof, a notch in another adjacent truck disposed at one side of the adjacent truck for engagement with said ear, said notch being open at said one side for engagement and disengagement of said ear and said notch by transverse swinging movement of one truck relatively to another adjacent truck, wheel supporting means for each said truck on said conveyor belt in which the wheel supporting means bears on the conveyor belt to rotate with the longitudinal movement of the conveyor and relatively to the truck.

References Cited

UNITED STATES PATENTS 2,974,518  3/1961  Jones _____ 73—1

RICHARD B. WILKINSON, *Primary Examiner.*

G. H. MILLER, JR., *Assistant Examiner.*